April 6, 1965  G. O. KIMMELL ETAL  3,176,510
WIRE LINE STRAIN GAUGE
Filed April 15, 1963 2 Sheets-Sheet 2
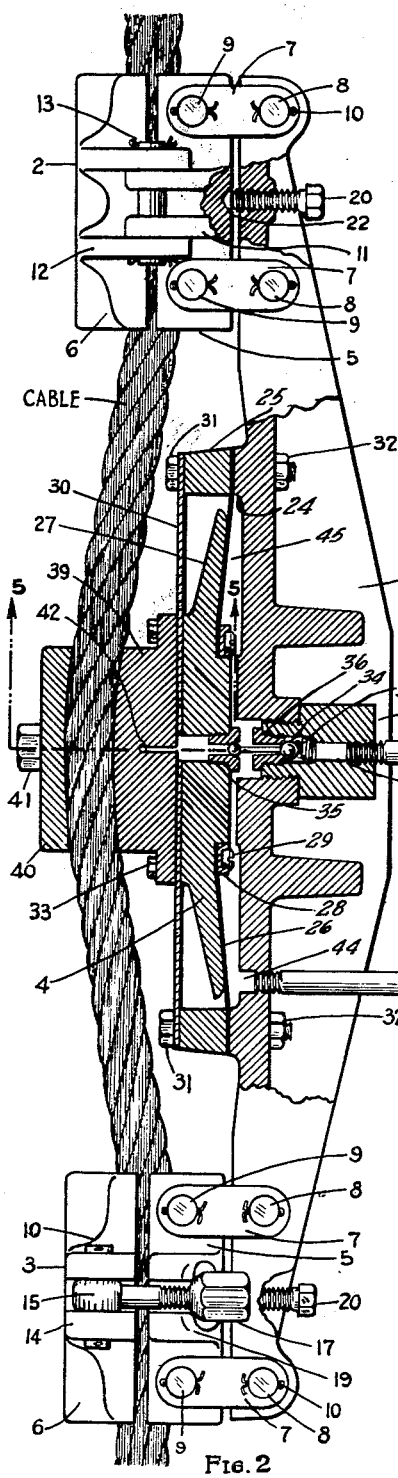
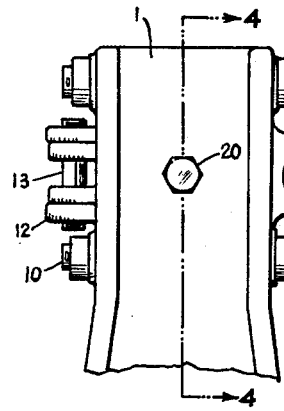
FIG. 3
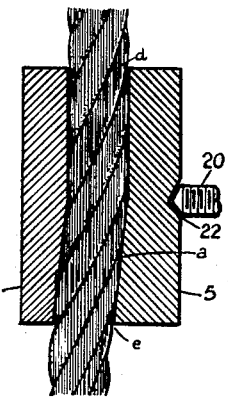
FIG. 4
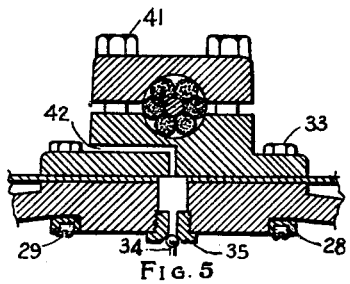
FIG. 5
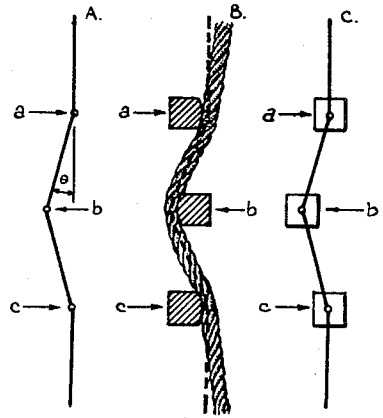
FIG. 6
INVENTOR.
Garman O. Kimmell
Art I. Robinson
BY
Earl Babcock ature of the strain unit of FIG. 1.

United States Patent Office 3,176,510
Patented Apr. 6, 1965

3,176,510
WIRE LINE STRAIN GAUGE
Garman O. Kimmell, 52 NW. 42nd St., Oklahoma City 18, Okla., and Art I. Robinson, 4505 Kenwood, Wichita Falls, Tex.
Filed Apr. 15, 1963, Ser. No. 273,212
12 Claims. (Cl. 73—144)

This invention relates to new and useful improvements in wire line strain gauges and particularly to the accurate measurement of strain in heavy stranded steel cables.

As shown and described in the U.S. patent to Shimek No. 2,013,810, granted September 10, 1935, it is known to measure the load in a cable by means responsive to forces tending to straighten a bend purposely placed in a portion of it, and to maintain the angle of deflection at the bend as nearly constant as possible so as to improve the accuracy of the measurement. Such an arrangement is useful in determining the load in a cable suspending deep well drilling apparatus, for example.

Conventional systems employing the principles described in the above mentioned Shimek patent, or similar principles, are not entirely satisfactory, however, for the reason that they are not capable of accurate and reproduceable results.

Upon deformation, high tensile stranded cables behave partly elastically and partly plastically. As taught by Shimek and others, the simplest way to measure the tension in a cable is to produce a bend or deflection in it and measure the forces tending to straighten it. The angle of deflection is called the "fleet angle." Unless the fleet angle is maintained accurately under all conditions of stress and temperature, the measurements are not accurate.

When a fleet angle is established in the cable by three relatively short saddles or three small diameter pulleys, the theoretical fleet angle and the actual fleet angles do not agree. Furthermore, the fleet angle varies with respect to the number of load cycles imposed, and upon the load itself.

The present invention is, therefore, directed to the establishment and maintenance of a pre-determined actual fleet angle and the elimination of friction.

A principal object of the invention is to provide a strain gauge which, when applied to a cable, will give highly reproduceable results from the (first) time stress is applied.

Another object of the invention is to provide a strain gauge which does not, in any way, injure or deform the cable to which it is attached.

A further object of the invention is to provide a means of attachment to the cable which preserves the calibration and which requires no further adjustment.

A still further object is to provide a strain gauge which eliminates friction between the cable and the attaching means and, also, the effects of friction within the cable itself.

Still another object of the invention is to provide a pneumatic strain gauge with an improved elastic frictionless support for the diaphragm and diaphragm plate which permits a single point of solid attachment of the apparatus to the cable without the use of guides or slides, and which elastic support can be used as a loading means to balance the elastic component of the deformed cable which would otherwise produce a zero tension off-set.

Various other objects and advantages of this invention will become apparent to those skilled in the art from the following detailed description when read in conjunction with the accompanying drawings which illustrate a preferred form of the invention.

FIG. 2 is a longitudinal view, partly in cross section and partly in elevation of the strain unit of FIG. 1.

FIG. 3 is a fragmentary side view of the top cable clamp of the unit of FIG. 2, the view being taken from the right-hand side of FIG. 2.

FIG. 4 is a cross-sectional view of the blocks of the top cable clamp of FIGS. 2 and 3, the view being taken on the line 4—4 of FIG. 5.

FIG. 5 is a cross-sectional view of the center clamp of the strain unit of FIG. 2, the view being taken at right-angles to the showing of FIG. 2 and on the line 5—5 thereof.

FIG. 6 is a diagram illustrating ideal and actual conditions when a cable having elasticity and plasticity is deflected under tension.

Figure 1:
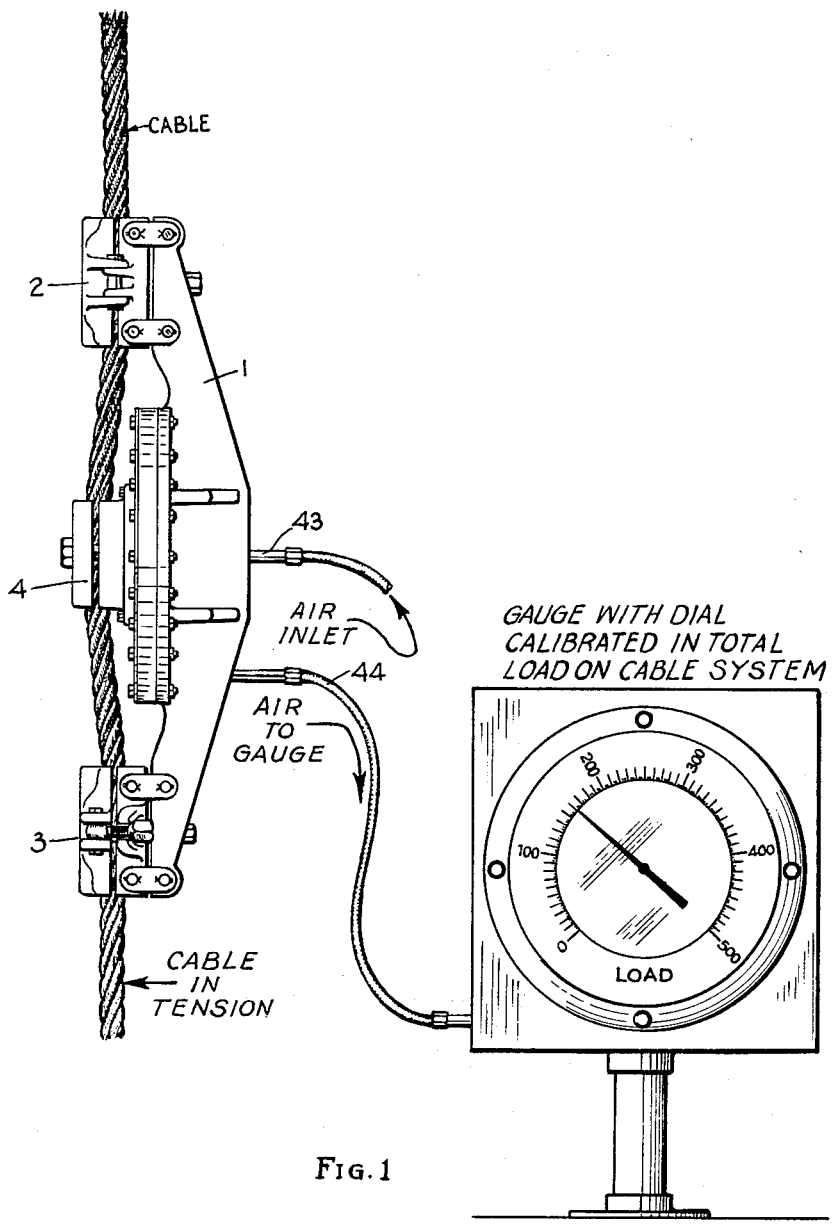
FIG. 1 is a view in side elevation of a strain unit applied to a cable, together with a front view of a pressure gauge for indicating the load in the cable, the arrangement being shown somewhat diagrammatically.

Referring to the drawings, and first to FIG. 6, deformation of an ideal cable is shown at A with the cable bent with respect to the three points $a$, $b$ and $c$, which are not in a straight line. The displacing force at $b$ is in balance with the equal restraining forces at $a$ and at $c$, to create and maintain the fleet angle $\theta$. Kinematically, this "ideal" cable is a free-pin linkage with pins at $a$, $b$, and $c$; and the displacing force at $b$ is equal to two times the product of sine $\theta$ and the tension.

Though somewhat exaggerated, an actual cable would assume the configuration shown at B in FIG. 6 if displaced by forces acting at $a$, $b$, and $c$. The position of an "ideal" cable is illustrated by the dotted line. The actual and ideal configurations are different because of the inherent stiffness of the cable. The actual cable configuration only approaches the ideal with an increase in tension and is never reached within the elastic limit of the cable. The departure of the actual cable configuration from the ideal results in a greater and inconsistent fleet angle $\theta$. Even under the condition of zero tension a substantial force exists at $b$ due to the inherent stiffness of the cable and produces a significant zero off-set. Because of the plastic behavior of the cable, its configuration over points $a$, $b$, and $c$ depends upon the tension to which the cable has been subjected. Each time the tension is increased to a value greater than that previously applied, there is a change in the configuration and a resultant change in the calibration.

The definition of fleet angle is further lost in conventional systems which use short saddles or relatively small pulleys. This is so because deformation and a subsequent change in cable radius takes place at these points.

The vector diagram of the present invention is shown at $c$ of FIG. 6. Here the cable is held in blocks which wrap substantially around the cable to form a monolithic containment. Within the confines of the blocks the fleet angle is formed and held. Sufficient length of the blocks is provided so that the loading on the cable to form the fleet angle is relatively low; an equivalent pulley diameter of 30 inches. The strain unit is supported on the line at point $b$, and points $a$ and $c$ are free to move longitudinally. This arrangement of elements provides the equivalent of the ideal free pin linkage shown at A in FIG. 6.

One form of apparatus for maintaining the ideal conditions shown at C of FIG. 6 is illustrated in FIGS. 1–5.

Referring to FIG. 1, it will be seen that the strain unit applied to the cable, the load on which is to be measured, consists essentially of a frame 1 which carries two end clamps 2 and 3 and a central clamp 4, together with a diaphragm assembly which serves to modify the air pressure on the gauge.

The clamps 2, 3, and 4 firmly engage the cable at three points, and hold it in a bent position with a definite fleet angle.

The details of the strain unit are shown in FIGS. 2–5.

As shown in FIGS. 2–4, each of the end clamps comprise an inner block 5 and an outer block 6. These blocks are grooved to conform to the cable, as shown in detail in FIG. 4. Each inner block 5 is attached to the frame 1 by four links 7 pivoted on frame pins 8 and block pins 9. The links are retained on the pins by any suitable locking means such as cotter pins 10. Inner and outer blocks 5 and 6 may be bolted together to provide substantially complete circumferential support for the cable. The inner block 5 may be furnished with ears 11, and the outer block 6 with ears 12, through which ears is disposed a hinge pin 13. This forms a hinge between the blocks 5 and 6. On the opposite side from the hinge, the block 6 may be provided with latch ears 14, to which a latch pin 15 is swiveled on its shaft 16. Threaded upon the pin 15 is a take-up nut 17 which operates in a socket 18 formed between two projections 19 on block 5.

Means for indexing the upper and lower clamps 2 and 3 with respect to central clamp 4, at the time of attachment to the cable, is provided. This consists of locking index screws 20 threaded to the frame 1 and pressing into the upper and lower clamps 2 and 3. The screws 20 have points which engage depressions 22 in inner blocks 5 of the clamps 2 and 3. Subsequent to indexing, the screws 20 are retracted to allow free movement of clamps 2 and 3. When indexed and then released, the clamps 2 and 3 may then be said to be floating with respect to the frame 1, insofar as longitudinal movement is concerned, when the cable stretches.

The diaphragm assembly in association with central clamp 4 comprises an inner housing 24 which is an integral part of the frame 1 and an outer housing ring 25. Between these housings is clamped the margin of a flexible diaphragm 26. The center of the diaphragm 26 is clamped between a plate 27 and a ring 28 by screws 29. Plate 27 is elastically supported by a metal diaphragm 30. The periphery of the diaphragm 30 is included in the bolting engagement of housings 24 and 25 by bolts 31 and nuts 32. The center of the diaphragm 30 is clamped rigidly to the plate 27 by screws 33.

A three-way valve structure operates housing 24 and plate 27. This consists of a pilot plug 34 operating in valving relation with a seat 35 in the plate 27 and a seat 36 retained within a supply cap 37. The supply cap is threaded to the housing 24. A spring 38 urges the valve element of pilot plug 34 onto the seat 36.

The central clamp 4 consists of a saddle support 39 and a saddle cap 40. These provide substantially complete circumferential support for the cable at the central point of the frame 1. The cable is clamped between the saddle support 39 and the saddle cap 40 by the screws 41. The fleet angle is established within the support 39 and cap 40 as shown in detail in FIG. 2.

A communication is formed between the valve element of seat 35 and the atmosphere by a passageway 42. A supply connection 43 is provided for cap 37 to bring a fluid, such as air, under pressure, to the strain unit. A pressure connection 44 to the chamber in housing 24 for enabling the gauge to measure the pressure in this chamber. It is this pressure which is acting on the diaphragm 26 in opposition to the force exerted by the cable when it is stretched.

The manner in which the strain unit operates to provide a measurement of the tension in the cable will now be described.

The strain unit is applied to the cable by first clamping it between saddle support 39 and its cap 40 with the points 21 of index screws 20 seated in depressions 22 of blocks 5. Blocks 6 are then closed onto the cable, and the take-up nuts 17 are tightened, thus forcing the cable into the proper configuration of the fleet angle. Thus, a precisely defined isosceles triangles has been established at the points a, b, and c, as shown in FIG. 6, at illustration C. The index screws 20 are then retracted.

Even with no tension in the cable, a nominal force appears at point b in illustration C of FIG. 6 because of the elastic component of the cable. This nominal force is allowed to depress the elastic metal diaphragm 30 and come to equilibrium with it. Supply cap is adjusted to bring the two valving elements of pilot plug 34 into simultaneous engagement with the valve seats 35 and 36. Under this condition of adjustment, no zero offset appears, and, when the cable is stretched, the tension in the cable will produce a proportional output signal on the gauge. Because all deformed portions of the cable are rigidly established, no significant change in the proportion of tension to signal takes place with variation of tension in the cable.

Because the end clamps 2 and 3 are floating and free to move with the portions of the cable they engage, there is no restraint on their movement as the cable stretches.

Moreover, because of the particular configuration of the blocks 5 and 6, the fleet angle is not changed significantly by movement of the clamps 2 and 3 with respect to the clamp 4, as the cable stretches. Essentially, the fleet angle is determined by the shape of the blocks, not by their distance from the central clamp 4.

There is no friction between the clamps and the cable because the clamps remain rigid with respect to the cable. There is no significant change in the plasticity of the cable no matter how many times stress is taken therein and then released.

The action of the valve mechanism operating between housing 24 and diaphragm 26 maintains pressure in chamber 45 in this housing at a value sufficient to maintain the position of central clamp 4 with reference to the end clamps 2 and 3 with practically no variation in the fleet angle even though there is considerable variation in the tension of the cable.

There is, of course, some deformation of the frame 1 upon load to the central clamp 4. Deflection of the frame is well within the elastic limit of the material, however, and it is small in reference to the fleet angle and is proportional to the load. This deflection or deformation of the frame is adverse to the precise linear relationship between the pressure in the chamber 45 and the load on central clamp 4 because of the slight change in the fleet angle, but this lack of linearity is highly reproducible and may be compensated in the gauge.

Metal diaphragm 30, though fairly rigid, behaves purely elastically and contributes only a minor off-set which can be easily corrected. Diaphragm 30 operates in shear to support the total weight of the apparatus on the cable, thus leaving both end clamps 2 and 3 free to move and resolve the force polygon into an equivalent free pin kinematic linkage.

The operation of the apparatus to develop a signal proportional to the tension in the cable will be apparent to those skilled in the art from what has been said above.

Except for the elastic deformation of the frame, the force polygon is maintained irrespective of the tension in the cable. The cable tends to straighten as tension increases and saddle support 39 is moved to the right as viewed in FIG. 2, unseating the large ball of pilot plug 34 from its valve seat 36 and permitting air to enter chamber 45 through supply connection 43. The increase in pressure in chamber 45 reacts against flexible diaphragm 26 to move the central clamp 4 to the left to re-establish the force polygon. At the instant the force polygon is re-established, the large ball of pilot plug 34 closes on valve seat 36 to arrest the flow into chamber 45. As long as tension of the cable remains constant, pressure in chamber 45 remains constant.

When tension in the cable decreases, pressure in chamber 45 is greater than that required to balance the load imposed upon it by the cable, and central clamp 4 moves to the left. The pilot plug 34 is held on the valve seat 36 by the supply pressure and by the spring 38, and is prevented from following the movement of central clamp 4. Seat 35 moves away from the small ball of the pilot plug 34, opening a passageway to atmosphere from chamber 45 through passageway 42. The resulting decrease in pressure in chamber 45 permits central clamp 4 to move to the right until the small sall of the pilot plug 34 just contacts the valve seat 35. Thus, from the operation of the pilot plug 34 on the seats 35 and 36, the pressure in the chamber 45 is automatically controlled to balance the force tending to straighten the cable. Accordingly, the signal, which is the pressure in chamber 45, is proportional to the tension in the cable.

While only one embodiment of the invention has been shown and described herein, it is obvious that various changes may be made in the arrangement and construction of parts without departing from the spirit of the invention or the scope of the annexed claims.

We claim:

1. A device for measuring tension in a cable, in combination, a strain unit consisting of a frame, two end clamps and a central clamp mounted on the frame and arranged to engage the cable firmly at three spaced points and hold the same in a bent position with a definite fleet angle, the two end clamps having means connected thereto for causing the end clamps to freely float lengthwise of the cable with respect to the frame when the portions of the cable with which they are engaged move away from the central clamp when the cable stretches.

2. A device as defined in claim 1 in combination with a diaphragm assembly and a fluid system having a pressure gauge, said diaphragm assembly being mounted on said central clamp and arranged to vary the pressure at the gauge in response to forces tending to stretch the cable.

3. A device as defined in claim 1 in which each end clamp has a groove therein, which groove, in itself, provides a precise fleet angle for the cable conforming to the angle of bend in the cable between each end point and the central point of engagement of the cable by the clamps.

4. A device as defined in claim 1 in combination with means for indexing the floating end clamps during attachment of the strain unit to the cable, the indexing means serving to establish a precise basis for the fleet angle prior to actual measurement of tension in the cable.

5. A cable tension measurement device including a frame with means thereon for deforming a cable, a diaphragm assembly on the frame, an elastic support for said diaphragm assembly which acts as a spring to balance the elastic effects of the deformed cable to eliminate zero off-set, a rigid central cable clamp attached to said diaphragm assembly, end cable clamps floating on said frame and serving, with said central clamp, to deform the cable and provide a precise fleet angle in the cable.

6. A fluid force balance operated type of tension measuring device for a cable including a frame, a diaphragm assembly thereon, an elastic support for said diaphragm assembly, a rigid central cable clamp attached to said assembly, two end clamps on said frame, arranged in other than a straight line with respect to said central cable clamp, and each adapted to move longitudinally on said frame when the cable stretches for preforming a precise fleet angle in the cable at points spaced from said central clamp and means for floating both of said end clamps insofar as longitudinal movement thereof is concerned.

7. A device as defined in claim 6 in combination with means for indexing the end clamps during attachment to the cable to establish a precise basis for the fleet angle.

8. A device for measuring tension in a cable including a frame, a central clamp and two end clamps thereon adapted to firmly grip a cable at three spaced points and create a bend in the cable, each clamp having means therein to deform the cable to conform to a predetermined fleet angle in the bend of the cable created by the location of the clamps on the frame.

9. A device as defined in claim 8 in combination with means for indexing the end clamps when they are attached to the cable before tension is taken in the cable so as to establish a precise basis for the fleet angle.

10. An arrangement for measuring tension in a cable including a strain unit having a frame and three clamps thereon capable of being firmly attached to the cable at three spaced points and hold the cable in a bent position with a definite fleet angle, a pressure gauge and a fluid system having a diaphragm connected to one of said clamps and to said pressure gauge, and means to vary the pressure at the gauge in response to forces tending to decrease the fleet angle when the cable is stretched under load.

11. The arrangement defined in claim 10 in which the fluid system includes means for applying fluid pressure on the diaphragm in opposition to the forces exerted thereon by load on the cable so as to prevent substantial decrease in the fleet angle.

12. A device for measuring tension in a cable including, in combination, a frame, a central clamp and two end clamps thereon adapted to firmly grip a cable at three spaced points and create a bend in the cable, means for floating the end clamps with respect to the frame, and means for indexing the end clamps with respect to the central clamp when the clamps are applied to the cable.

References Cited by the Examiner

UNITED STATES PATENTS

| 2,867,411 | 1/59 | Simmonds et al. | 254—173 |
| 2,988,915 | 6/61 | Knight et al. | 73—144 |

References Cited by the Applicant

UNITED STATES PATENTS

| 1,780,141 | 10/30 | Goldman. |
| 2,013,810 | 9/35 | Shimek. |
| 2,099,955 | 11/37 | Edwards. |
| 2,528,883 | 11/50 | Hayward. |
| 2,659,574 | 11/53 | Crookston. |
| 2,659,575 | 11/53 | Seljos. |
| 2,696,111 | 12/54 | Conner. |
| 2,703,008 | 3/55 | Seljos. |
| 3,031,169 | 4/62 | Robinson et al. |

RICHARD C. QUEISSER, *Primary Examiner.*

JOSEPH P. STRIZAK, *Examiner.*